United States Patent Office 3,534,241
Patented Oct. 13, 1970

3,534,241
BATTERY CHARGER
Arthur M. Wilson, Attleboro, Mass., and Yury G. Trenkler, East Providence, R.I., assignors to Texas Instruments Incorporated, Dallas, Tex., a corporation of Delaware
Filed Sept. 17, 1968, Ser. No. 760,197
Int. Cl. H02j 7/10
U.S. Cl. 320—33
12 Claims

ABSTRACT OF THE DISCLOSURE

The battery charger disclosed provides a charging current which tapers off as the battery approaches a fully charged condition and then automatically switches or latches into a non-charging or off condition. The latching operation is provided by a heater which is energized by the charging current and a thermistor which responds to variations in temperature of the heater and causes the charger to switch to its non-charging state when the temperature of the heater falls below a predetermined level.

This invention relates to battery chargers and more particularly to such a charger which will turn itself off after a predetermined charge level has been reached.

In charging sealed batteries such as nickel-cadmium, nickel zinc, silver zinc and lead acid batteries and the like, it is important that the charging current be tapered off as the battery approaches a fully charged condition and that the charging then be stopped so that the batteries are not damaged by the generation of heat and/or excessive internal pressures.

Among the several objects of the present invention may be noted the provision of battery charging apparatus which will rapidly and safely charge a sealed battery; the provision of such apparatus which will taper the charging current as the battery approaches a fully charged condition; the provision of such apparatus which will charge a battery to its maximum capacity; the provision of such apparatus which will automatically stop charging when the battery is fully charged; the provision of such apparatus which is highly reliable; and the provision of such apparatus which is relatively simple and inexpensive. Other objects and features will be in part apparent and in part pointed out hereinafter.

Briefly, battery charging apparatus of this invention includes a current control device for controlling the flow of charging current to the battery, conduction through the device being variable as a function of a control voltage applied thereto. A control circuit applies to the device a control voltage which reduces the charging current as the battery approaches a fully charged condition. A heater connected in series with the batery in the charging circuit is energized as a function of the charging circuit and thereby caused to generate heat. A thermistor in heat-exchange relationship with the heater is interconnected with the control circuit for varying the control voltage to terminate conduction through the device when the temperature of the heater falls below a predetermined level. Accordingly, when the charging current tapers off as the battery approaches a fully charged condition, the device is finally turned off by the thermistor as the heater cools down, thereby latching the charging apparatus in an off condition.

The invention accordingly comprises the constructions hereinafter described, the scope of the invention being indicated in the following claims.

Figure 1:
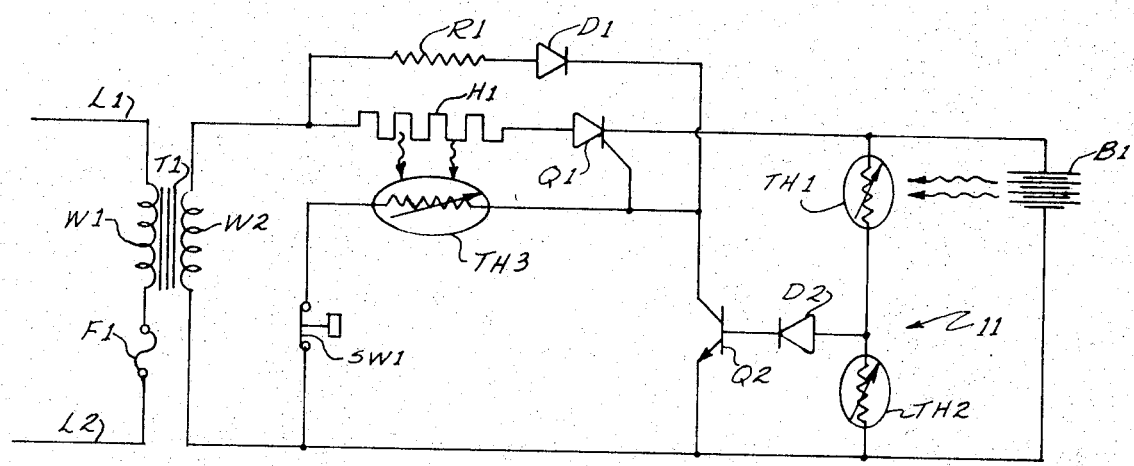
Figure 2:
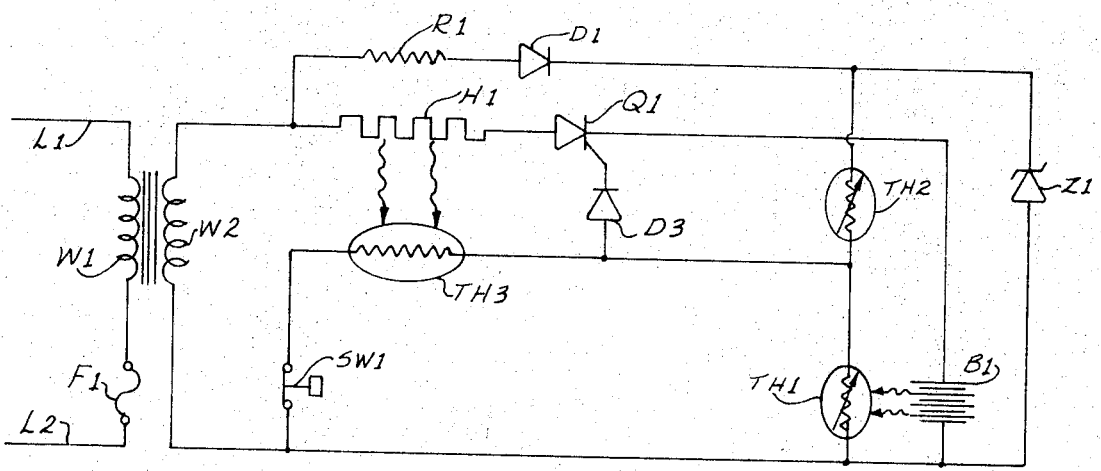

In the accompanying drawings, in which several of various possible embodiments of the invention are illustrated, FIG. 1 is a schematic circuit diagram of battery charging apparatus of this invention; and
FIG. 2 is a schematic circuit diagram of another embodiment of the invention.

Corresponding reference characters indicate corresponding parts throughout the several views of the drawings.

Referring now to FIG. 1, a battery which is to be charged is indicated at B1. Electric power for charging the battery is obtained from a pair of A.C. supply mains L1 and L2 through a step-down transformer T1 having a primary winding W1 and a secondary winding W2. A protective fuse F1 is interposed in the primary winding circuit.

Current from the secondary winding W2 is applied to the battery B1 through a SCR (silicon controlled rectifier) Q1. As is understood by those skilled in the art, SCR Q1 is a triggerable semi-conductor current control device which operates in a switching mode. The anode of SCR Q1 is connected to one side of the secondary winding W2 through a resistive heater H1 and its cathode is connected to the positive terminal of battery B1. The negative terminal of battery B1 is connected to the other end of secondary winding W2.

A control voltage for controlling conduction through SCR Q1 is applied to its gate from a voltage divider comprised of a resistor R1 and a diode D1 and a transistor Q2. Conduction through transistor Q2 is controlled by a voltage divider 11 comprising a pair of thermistors TH1 and TH2. The voltage divider 11 is connected across the battery so as to be responsive to the battery voltage. The junction between the two thermistors is connected to the base terminal of transistor Q2 through a diode D2 which provides a predetermined voltage drop or threshold which must be overcome before the transistor is forward biased.

Thermistor TH2 is of the NTC type, that is, it has a negative temperature coefficient of resistivity, and is responsive to ambient temperature in the environment of the charging circuit to compensate for changes in the operating threshold of transistor Q2. Thermistor TH1 is also of the NTC type and is in close heat-exchange relationship with battery B1 as is indicated by the wavy arrows coupling these elements.

It has been found that the temperature rise which occurs as the battery is being charged is a reliable indicator of state-of-charge and that the temperature rise has a point of inflection corresponding more closely to the fully charged condition than the point of inflection in the battery voltage itself or the point of inflection in the battery internal pressure characteristic. Thermistor TH1 thus responds to heating of the battery upon charging, particularly as the battery approaches a fully charged condition. The nominal values of thermistors TH1 and TH2 are selected so that the transistor Q2 is normally cut off when the battery B1 is at normal ambient temperatures.

The gate circuit of SCR Q1, including the collector-emitter circuit of transistor Q2, is shunted by a PTC thermistor TH3 in series with a normally closed push-button switch SW1. Thermistor TH3 is of the type having a transition temperature above which the resistance of the thermistor rises relatively abruptly, such thermistors sometimes being referred to as switching type thermistors. Thermistors of this type are commonly used in motor protection circuits and the like. Thermistor TH3 is thermally coupled to the heater H1, as indicated by the wavy arrows coupling these two elements, so as to be responsive to changes in the temperature of the heater. The characteristics of the PTC thermistor TH3 are selected so that it has a relatively low resistance at normal ambient temperatures, which low resistance will prevent the application of a triggering voltage from the collector of transistor Q2 to the gate of SCR Q1.

The operation of this charging apparatus is substantially as follows, only the positive half cycles of the A.C. supply waveform being considered. To initiate a charging cycle, the switch SW1 is momentarily opened. When switch SW1 is open, current flowing through resistor R1 and diode D1 enters the gate of SCR Q1 triggering it into conduction on each positive A.C. half cycle. The switch SW1 thus provides means for selectively biasing the SCR into conduction independently of the thermistor TH3. Rectified current flowing through the SCR charges the battery and also energizes the heater H1. Once the temperature of heater H1 has risen substantially above ambient, the switch SW1 can be released since the heat coupled to thermistor TH1 causes its resistance to increase to a level such that it will not interfere with triggering of SCR Q1. Thus charging of battery B1 will continue after the switch is closed.

Until the battery B1 approaches its fully charged condition it does not heat appreciably. Thus the SCR Q1 is triggered into conduction early in each positive half cycle under control of the voltage divider and thus a full charging current is maintained thereby quickly charging the battery. However, as the battery B1 does approach its fully charged condition, the generation and re-combination of gases therein will cause its temperature to rise. This rise in temperature is sensed by the thermistor TH1 which thereby experiences a drop in resistance relative to the resistance of thermistor TH2. Accordingly, the voltage at the junction between thermistors TH1 and TH2 will rise. Once the voltage at the junction between the thermistors reaches a predetermined threshold, transistor Q2 is biased into conduction and will shunt current flowing through resistor R1 away from the gate circuit of SCR Q1, that is, this control circuit will lower the control voltage applied to the gate of SCR Q1. This lowering in the voltage applied to the SCR gate is augmented by the increase in the battery voltage which occurs as it approaches its fully charged condition.

As the gate voltage decreases relative to the cathode voltage, conduction through the SCR is reduced, first by phase-angle modulation of its conductivity, that is, by delaying the triggering of the SCR within each half cycle, and then by the occurrence of increasing numbers of half cycles during which the SCR is not triggered at all. Accordingly, the charging current is tapered or gradually diminished so that the rate of charging is reduced as the battery approaches its fully charged condition. As is understood by those skilled in the art, such tapering is desirable if the battery is to be charged to its maximum capacity. Finally, as the battery is charged substantially to its full capacity, the heat generated by heater H1 decreases to such an extent that the resistance of PTC thermistor TH3 begins to affect the control voltage applied to the gate of the SCR. This operation is regenerative in that cooling of thermistor TH3 produces a further reduction in conduction through SCR Q1 which in turn reduces the amount of heat generated by heater H1. Accordingly, once the temperature of the heater falls below a predetermined level, the charging circuit quickly latches into its off state and remains in this state until another charging cycle is initiated by opening the switch SW1. It can thus be seen that the battery is rapidly charged; that the charging current is tapered off as the battery approaches its fully charged condition; that the battery is charged substantially to its full capacity; and that the charging apparatus automatically latches itself into an off condition when this fully charged condition is reached.

In the embodiment shown in FIG. 2, conduction through SCR Q1 is controlled directly by the voltage divider comprising thermistors TH1 and TH2. The divider is inverted and is provided with a regulated source voltage by a Zener diode Z1, current being applied to the Zener diode through resistor R1 and diode D1. The junction between thermistors TH1 and TH2 is connected to the gate of SCR Q1 through a diode D3. Again, the circuit including the thermistor TH3 and the switch SW1 shunts the SCR gate circuit.

The operation of this second embodiment is substantially as follows. To initiate a charging cycle, the switch SW1 is momentarily opened. When the switch is opened, current flowing through thermistor TH2 triggers the SCR Q1 into conduction. Conduction through SCR Q1 allows current from the source to charge the battery B1 and to energize the heater H1. After a brief delay for the heater H1 to reach its operating temperature, the resistance of TH3 increases to such an extent that it will not prevent the triggering of SCR Q1. At this point the switch SW1 can be released.

As the battery B1 approaches its fully charged condition, the heat generated therein causes the resistance of NTC thermistor TH1 to decrease thereby reducing the control voltage applied to the gate of SCR Q1. The charging current is thereby reduced or tapered, as described previously, so that the battery is more gradually brought up to its fully charged condition. Finally, as the charging current tapers off, the heat generated by heater H1 decreases so that the resistance of the PTC thermistor TH3 decreases thereby shunting the gate circuit of SCR Q1 and reducing the control voltage still further. Again this is a regenerative condition with the reduction in gate voltage causing a further reduction in conduction through the SCR thereby in turn reducing the heat provided to thermistor TH3. Accordingly, this circuit quickly latches into an off state in which no charging current is applied to the battery B1.

Whereas an SCR operating to rectify A.C. supply current has been shown by way of illustration, it should be understood that other current control or current switching devices may be used. For example, a transistor may be operated from a relatively high voltage D.C. supply to charge a battery at a lower voltage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for charging a battery, said apparatus comprising:
   a current control device for controlling the flow of charging current to said battery, conduction through said device being variable as a function of a control voltage applied thereto;
   control circuit means for applying to said device a control voltage which reduces the charging current as said battery approaches a fully charged condition;
   a heater in series with said battery in the charging circuit, the energization of said heater being thereby varied as a function of the charging current;
   a thermistor in heat-exchange relationship with said heater for responding to variations in the temperature of said heater, said thermistor being interconnected with said control circuit means for varying said control voltage to terminate conduction through said device when the temperature of said heater falls below a predetermined level, said control circuit including means for selectively biasing said current control device into conduction independently of the operation of said thermistor thereby to start charging of said battery and heating of said heater, whereby during charging the charging current tapers off as said battery approaches a fully charged condition and then said device is turned off by said thermistor as said heater cools down thereby latching said charging apparatus in an off condition.

2. Apparatus as set forth in claim 1 wherein said current control device is an SCR which is energized from an A.C. source.

3. Apparatus as set forth in claim 2 wherein said thermistor has a positive temperature coefficient of resistivity and shunts the gate circuit of said SCR.

4. Apparatus as set forth in claim 3 wherein said thermistor is of the switching type having a transition temperature above which the resistance of the thermistor rises relatively abruptly.

5. Apparatus as set forth in claim 3 wherein said means for selectively biasing said current control device into conduction includes a normally closed switch in series with said thermistor.

6. Apparatus as set forth in claim 1 wherein said control circuit means comprises a voltage divider including a thermistor which is responsive to heating of said battery upon charging.

7. Apparatus as set forth in claim 6 wherein said control circuit means includes a transistor the conductivity of which is controlled by said voltage divider.

8. Apparatus as set forth in claim 6 including means for regulating the voltage across said voltage divider.

9. Apparatus as set forth in claim 6 wherein said voltage divider includes a second thermistor which is responsive to ambient temperature.

10. Apparatus for charging a battery from an A.C. source, said apparatus comprising:
    an SCR in series with said battery for controlling the flow of charging current, conduction through said SCR being variable as a function of a voltage applied to the gate of said SCR;
    control circiut means for applying to the gate of said SCR a control voltage, said control circuit means including a first thermistor which is responsive to the temperature of said battery for reducing said control voltage as said battery approaches a fully charged condition;
    a heater in series with said battery and said SCR in the charging circuit, the energization of said heater being thereby varied as a function of the charging current;
    a PTC thermistor in heat-exchange relationship with said heater for responding to variations in the temperature of said heater, said thermistor being interconnected with said control circuit means for reducing said control voltage to terminate conduction through said SCR when the temperature of said heater falls below a predetermined level, said control circuit including a switch for selectively disconnecting said PTC thermistor thereby to start charging of said battery and heating of said heater, whereby during charging the charging current tapers off as said battery approaches a fully charged condition and then said SCR is turned off by said PTC thermistor as said heater cools down thereby latching said charging apparatus in an off condition.

11. Apparatus for charging a battery from an A.C. source, said apparatus comprising:
    an SCR in series with said battery for controlling the flow of charging current, conduction through said SCR being variable as a function of a voltage applied to the gate of said SCR;
    means for providing triggering current to the gate of said SCR;
    a transistor for selectively shunting said triggering current away from the gate of said SCR;
    a voltage divider for controlling the conductivity of said transistor, said divider being connected across said battery and including a first thermistor which is responsive to the temperature of said battery for increasing the conductivity of said transistor as said battery approaches a fully charged condition;
    a heater in series with said battery and said SCR in the charging circuit, the energization of said heater being thereby varied as a function of the charging current;
    a PTC thermistor in heat-exchange relationship with said heater for responding to variations in the temperature of said heater, said thermistor being connected shunting said transistor to terminate conduction through said SCR when the temperature of said heater falls below a predetermined level; and
    a switch for selectively disconnecting said PTC thermistor thereby to start charging of said battery and heating of said heater, whereby during charging the charging current tapers off under control of said first thermistor as said battery approaches a fully charged condition and then said SCR is turned off by said PTC thermistor as said heater cools down thereby latching said charging apparatus in an off condition.

12. Apparatus for charging a battery from an A.C. source, said apparatus comprising:
    an SCR in series with said battery for controlling the flow of charging current, conduction through said SCR being variable as a function of a voltage applied to the gate of said SCR;
    means for providing triggering current to the gate of said SCR;
    a voltage divider for applying a control voltage to the gate of said SCR to control the conductivity of said SCR, said divider being connected across means providing a substantially constant voltage and including a first thermistor which is responsive to the temperature of said battery for decreasing the conductivity of said SCR as said battery approaches a fully charged condition;
    a heater in series with said battery and said SCR in the charging circuit, the energization of said heater being thereby varied as a function of the charging current;
    a PTC thermistor in heat-exchange relationship with said heater for responding to variations in the temperature of said heater, said thermistor being connected shunting the gate circuit of said SCR to terminate conduction through said SCR when the temperature of said heater falls below a predetermined level; and
    a switch for selectively disconnecting said PTC thermistor thereby to start charging of said battery and heating of said heater, whereby during charging the charging current tapers off under control of said first thermistor as said battery approaches a fully charged condition and then said SCR is turned off by said PTC thermistor as said heater cools down thereby latching said charging apparatus in an off condition.

References Cited
UNITED STATES PATENTS

| | | |
|---|---|---|
| 3,387,199 | 6/1968 | Billerbeck et al. |
| 3,453,519 | 7/1969 | Hunter _____ 320—35 |
| 3,457,489 | 7/1969 | Gentry et al. |

J D MILLER, Primary Examiner

J. M. GUNTHER, Assistant Examiner

U.S. Cl. X.R.

320—22, 35, 39